United States Patent
Jimenez et al.

(10) Patent No.: US 9,758,614 B2
(45) Date of Patent: Sep. 12, 2017

(54) POLYESTER POLYOL AND POLYOL BLENDS AND RIGID POLYURETHANE FOAM MANUFACTURING

(71) Applicant: DOW GLOBAL TECHNOLOGIES LLC, Midland, MI (US)

(72) Inventors: Jorge Jimenez, Lake Jackson, TX (US); Guiseppe Lista, Modena (IT); Davide Micheletti, Formigine (IT)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/914,484

(22) PCT Filed: Sep. 20, 2014

(86) PCT No.: PCT/US2014/056699
§ 371 (c)(1),
(2) Date: Feb. 25, 2016

(87) PCT Pub. No.: WO2015/047919
PCT Pub. Date: Apr. 2, 2015

(65) Prior Publication Data
US 2016/0200856 A1    Jul. 14, 2016

(51) Int. Cl.
| | |
|---|---|
| C08G 18/48 | (2006.01) |
| C08G 18/42 | (2006.01) |
| C08G 18/08 | (2006.01) |
| C08G 18/76 | (2006.01) |
| C08J 9/14 | (2006.01) |
| C08G 63/42 | (2006.01) |
| C08G 63/58 | (2006.01) |
| C08G 18/10 | (2006.01) |
| C08G 18/12 | (2006.01) |
| C08G 18/40 | (2006.01) |
| C08J 9/02 | (2006.01) |
| C08G 101/00 | (2006.01) |

(52) U.S. Cl.
CPC ......... *C08G 18/4883* (2013.01); *C08G 18/10* (2013.01); *C08G 18/12* (2013.01); *C08G 18/14* (2013.01); *C08G 18/4018* (2013.01); *C08G 18/4208* (2013.01); *C08G 18/4291* (2013.01); *C08G 18/4294* (2013.01); *C08G 18/7671* (2013.01); *C08G 63/42* (2013.01); *C08G 63/58* (2013.01); *C08J 9/02* (2013.01); *C08J 9/141* (2013.01); *C08G 2101/00* (2013.01); *C08G 2101/0025* (2013.01); *C08J 2201/022* (2013.01); *C08J 2203/14* (2013.01); *C08J 2205/10* (2013.01); *C08J 2375/06* (2013.01); *C08J 2375/08* (2013.01)

(58) Field of Classification Search
CPC ............ C08G 18/4018; C08G 18/4291; C08G 18/4294
See application file for complete search history.

(56) References Cited

U.S. PATENT DOCUMENTS

| | | |
|---|---|---|
| 3,827,993 A | 8/1974 | Cunningham |
| 4,797,464 A | 1/1989 | Nodelman |
| 5,451,615 A | 9/1995 | Birch |
| 5,922,779 A | 7/1999 | Hickey |
| 6,245,826 B1 | 6/2001 | Wilson |
| 6,268,402 B1 | 7/2001 | Wilson |
| 6,294,107 B1 | 9/2001 | Peters |
| 6,322,722 B1 | 11/2001 | Bhattacharjee |
| 6,420,443 B1 | 7/2002 | Clark |
| 6,461,536 B2 | 10/2002 | Wilson |
| 6,472,446 B1 | 10/2002 | Riley |
| 6,710,095 B2 | 3/2004 | Araullo-McAdams |
| 8,188,156 B2 * | 5/2012 | Yamanaka ......... C08G 18/4018 521/155 |
| 2009/0312447 A1 | 12/2009 | Hickey |

FOREIGN PATENT DOCUMENTS

| | | |
|---|---|---|
| CN | 102115528 A | 7/2011 |
| EP | 1754737 A | 2/2007 |
| GB | 1420773 A | 1/1976 |
| WO | 2007/094780 A | 8/2007 |
| WO | 2013/053555 A | 4/2013 |

\* cited by examiner

*Primary Examiner* — Melissa Rioja

(57) ABSTRACT

A polyester polyol is formed in a polycondensation reaction between an aromatic dicarboxylic acid, a polyol, and an epoxy compound having a straight chain alkyl or alkenyl group having at least six carbon atoms. The polyester polyol exhibits excellent compatibility with hydrocarbon blowing agents. As such, it is a useful component in rigid polyurethane foam formulations that are contain hydrocarbon blowing agents.

10 Claims, No Drawings

POLYESTER POLYOL AND POLYOL BLENDS AND RIGID POLYURETHANE FOAM MANUFACTURING

This invention pertains to polyols and polyol blends that are useful for manufacturing rigid polyurethane foams, as well as rigid foams made from those polyols.

Rigid polyurethane foams have been used widely for several decades as insulation foam in appliances and other applications, as well as a variety of other uses. These foams are prepared in a reaction of a polyisocyanate and one or more polyol, polyamine or aminoalcohol compounds. The reaction is conducted in the presence of a blowing agent that generates a gas as the reaction proceeds. The gas expands the reacting mixture and imparts a cellular structure.

The blowing agent is most typically a mixture of water (which reacts with isocyanate groups to generate carbon dioxide) and a low-boiling hydrocarbon such as cyclopentane. In many foaming processes, the blowing agent is blended with the isocyanate-reactive materials in advance of the foam-manufacturing step to form a formulated "polyol" component. The formulated polyol component is stored for periods that may be as long as several months, before it is combined with a polyisocyanate and used to produce the rigid foam.

The problem is that the hydrocarbon blowing agent is poorly soluble in the polyols. Because of the poor solubility, a mixture of hydrocarbon blowing agent and polyols tends to phase separate over time. This leads to very significant problems in the foaming process.

The difficulty in resolving this problem stems from the need to obtain the necessary compatibility without unduly interfering with the properties of the foam or the foaming process itself. The most important foam properties of course are low foam density (to minimize raw material costs) and low foam thermal conductivity. These should not be compromised to obtain better blowing agent compatibility. Physical properties are also important, as the foam must retain enough mechanical strength to withstand the demands of its particular application.

On the processing side, the most important attributes are curing rates and a characteristic often referred to as "flow". Curing rates relate to the amount of time needed before the foam can be "demolded". In appliance manufacture, a mechanical apparatus (often called a "jig") typically holds the exterior shell and inner lining in position as the foam formulation is introduced into the cavity and cured. "Demolding" in appliance manufacturing refers to the time at which the foam-filled appliance part can be released from the "jig" or similar apparatus, so the equipment becomes available for producing the next subsequent part. Demold times directly impact equipment utilization rates, which directly impact production costs. Therefore, a formulation change that leads to better compatibilization of the hydrocarbon blowing agent should not do so at the cost of increased demold times.

"Flow" (or "flow index") relates to the ability of a reacting foam formulation to fill an enclosed volume. A foam formulation will expand to a certain density (known as the 'free rise density') if permitted to expand against minimal constraints. When the formulation must fill a refrigerator or freezer cabinet, its expansion is somewhat constrained in several ways. The foam must expand mainly in a vertical (rather than horizontal) direction within a narrow cavity. As a result, the formulation must expand against a significant amount of its own weight. The foam formulation also must flow around corners and into all portions of the wall cavities. In addition, the cavity often has limited or no venting, and so the atmosphere in the cavity may exert additional pressure on the expanding foam. Because of these constraints, a greater amount of the foam formulation is needed to fill the cavity than would be predicted from the free rise density alone. The amount of foam formulation needed to minimally fill the cavity can be expressed as a minimum fill density (the weight of the formulation divided by the cavity volume). The ratio of the minimum fill density to the free rise density is the flow index. The flow index is ideally 1.0, but is on the order of 1.2 to 1.8 in commercially practical formulations. Lower flow index is preferred, all other things being equal, because raw material costs are lower when a smaller weight of foam is needed.

This problem of blowing agent compatibilization is a long-standing one. See, e.g., U.S. Pat. No. 5,451,616, U.S. Pat. No. 5,922,779, U.S. Pat. No. 6,245,826, U.S. Pat. No. 6,258,866, U.S. Pat. No. 6,268,402, U.S. Pat. No. 6,294,107, U.S. Pat. No. 6,322,722, U.S. Pat. No. 6,420,443, U.S. Pat. No. 6,472,446, U.S. Pat. No. 6,461,536, U.S. Pat. No. 6,710,095, US Published Patent Application No. 2009-0312447 and JP 2002-038269. As a review of these references will demonstrate, the problem of hydrocarbon blowing agent compatibility has not been adequately resolved. Although there are mechanical approaches to dealing with the problem, the preference in the industry is to find a chemical solution. Accordingly, the foregoing references focus on the use of compatibilizing agents to solubilize the hydrocarbon blowing agent into the polyols. The two main types of these are various types of surfactants, and modified polyols that have greater compatibility with the hydrocarbon blowing agent.

Surfactants are often expensive, and are needed in large amounts to be effective. It is noted in this regard that foam formulations already require a surfactant to stabilize the reaction mixture as it expands and foams. That foam stabilizing surfactant typically is not effective to stabilize the blowing agent, and so the compatibilizing surfactant is used in addition to this foam stabilizing surfactant. The presence of large amounts of compatibilizing surfactant can have an adverse effect on foam properties, notably demold times.

The modified polyols typically contain one or more long-chain alkyl groups, which lend some hydrophobicity and therefore increase compatibility with the hydrocarbon blowing agent. A modified polyol of this type, which is commonly used, is available commercially as Stepan PS2352. This polyol is believed to be manufactured according to the methods described in U.S. Pat. No. 5,922,779, by forming a polyester from a phthalic acid based material and a low molecular weight polyol and transesterifying the polyester with a vegetable oil. As shown in U.S. Pat. No. 5,922,779 and in US 2009-0312447, large quantities of a compatibilizing surfactant are still needed (in addition to the ordinary foam stabilizing surfactant), despite the use of the modified polyol.

What is needed is an effective way to compatibilize a hydrocarbon blowing agent in a polyol or polyol mixture suitable for making a rigid polyurethane foam, which does not have a significant adverse impact on foam density, foam thermal conductivity or processing. The compatibilization method preferably requires at most small amounts of an additional surfactant or other auxiliary compatibilizer.

This invention is in a first aspect a polyester polyol formed by polycondensation of
(i) at least one aromatic dicarboxylic acid, aromatic dicarboxylic anhydride or aromatic dicarboxylic acid diester;

(ii) a polyol having at least two hydroxyl groups per molecule, or a mixture of two or more such polyols; and (iii) an epoxy compound having at least one aliphatic oxirane group and at least one straight chain alkyl or alkenyl group having at least six carbon atoms; until the carboxylic acid, anhydride or ester groups and the aliphatic oxirane groups are essentially consumed, to produce a polyester polyol having an average hydroxyl functionality of at least 2 hydroxyl groups per molecule, a hydroxyl equivalent weight of 100 to 2000 and at least one straight chain alkyl or alkenyl group having at least six carbon atoms corresponding to the straight chain alkyl or alkenyl group of the epoxy compound.

The invention is also a polyol blend comprising a) at least 40% by weight, based on the combined weights of all polyols in the polyol blend, of a polyether polyol having a hydroxyl functionality of greater than four and a hydroxyl equivalent weight of up to 250;

b) at least 10% by weight, based on the combined weights of all polyols in the polyol blend, of at least one polyether polyol having a hydroxyl functionality of 2 to 4 and a hydroxyl equivalent weight of up to 700; and c) 8 to 30% by weight, based on the combined weights of all polyols in the polyol blend, of the polyester polyol of the invention.

The invention is also a formulated polyol composition comprising 75 to 90% by weight of a mixture of polyols and 10 to 25% by weight of a hydrocarbon blowing agent, the weight percentages being based on the combined weight of the polyols in the formulated polyol composition and the hydrocarbon blowing agent, wherein the polyols comprise a) at least 40% by weight, based on the combined weights of all polyols in the formulated polyol composition, of a polyether polyol having a hydroxyl functionality of greater than four and a hydroxyl equivalent weight of up to 250;

b) at least 10% by weight, based on the combined weights of all polyols in the formulated polyol composition, of at least one polyether polyol having a hydroxyl functionality of 2 to 4 and a hydroxyl equivalent weight of up to 400; and c) 8 to 30% by weight, based on the combined weights of all polyols in the formulated polyol composition, of the polyester polyol of the invention.

The invention is also a process for preparing a rigid polyurethane foam, comprising A) mixing at least one polyisocyanate compound with a formulated polyol composition at an isocyanate index of 80 to 1000 to form a reactive mixture and B) curing the reactive mixture to form a rigid polyurethane foam, wherein the formulated polyol composition comprises 75 to 90% by weight of a mixture of polyols and 10 to 25% by weight of a hydrocarbon blowing agent, the weight percentages being based on the combined weight of the polyols in the formulated polyol composition and the hydrocarbon blowing agent, wherein the polyols comprise a) at least 40% by weight, based on the combined weights of all polyols in the formulated polyol composition, of a sorbitol-initiated polyether polyol having a hydroxyl equivalent weight of up to 250;

b) at least 10% by weight, based on the combined weights of all polyols in the formulated polyol composition, of at least one polyether polyol having a hydroxyl functionality of 2 to 4 and a hydroxyl equivalent weight of up to 700; and c) 8 to 30% by weight, based on the combined weights of all polyols in the formulated polyol composition, of the polyester polyol of the first aspect of the invention.

The polyester polyol of the invention a reaction product of:

(i) at least one aromatic dicarboxylic acid, aromatic dicarboxylic anhydride or aromatic dicarboxylic acid diester;

(ii) at least one polyol having at least two hydroxyl groups; and (iii) an epoxy compound having at least one aliphatic oxirane group and at least one straight chain alkyl or alkenyl group having at least six carbon atoms.

The aromatic dicarboxylic acid, anhydride or diester thereof is a compound in which the carbonyl carbon of each acid, anhydride or ester group is bonded directly to the carbon atom of an aromatic ring. Preferably both carbonyls are bonded to the same ring. Phthalic acid, phthalic anhydride, dialkyl esters of phthalic acid (such as the methyl or ethyl diesters), isophthalic acid, isophthalic anhydride, dialkyl esters of isophthalic acid (such as the methyl or ethyl esters), terephthalic acid, terephthalic anhydride, dialkyl esters of terephthalic acid (such as the method or ethyl diesters), trimellitic acid, trimellitic anhydride, or derivatives of any of the foregoing in which one or more carbons on the aromatic ring are substituted with, for example, alkyl, halogen or ether groups.

The polyol used to make the polyester polyol of the invention may be, for example, a diol such as ethylene glycol, 1,2-propane diol, 1,3-propane diol, diethylene glycol, triethylene glycol, dipropylene glycol, 1,4-butane diol, 1,2-cyclohexanediol, glycerin, trimethylolpropane, trimethylolethane, 2,2-dimethyl-1,3-propane diol, erythritol, pentaerythritol and the like, as well as alkoxylates of any of the foregoing. The polyol may have an equivalent weight of up to 500 or more, preferably up to 175, more preferably up to 100 and still more preferably up to 75. The polyol preferably has 2 to 4, especially 2 or 3, hydroxyl groups per molecule. A mixture of two or more such polyols can be used. In the case of a mixture, the mixture preferably has an average equivalent weight up to 175, preferably up to 100, especially up to 75, and an average hydroxyl functionality of 2 to 4, especially 2 to 3, hydroxyl groups per molecule.

The epoxy compound may be, for example, a glycidyl ether of an alkanol that has at least six, preferably at least eight carbon atoms. Such glycidyl ethers are preferably monoepoxide compounds. Such glycidyl ethers can be represented by the structure

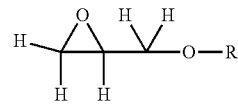

wherein R is an alkyl or alkenyl group having at least six, preferably at least 8 carbon atoms. R may have up to 30 carbon atoms, and more preferably up to 24 carbon atoms. In especially preferred embodiments, the R group contains 10 to 18 carbon atoms, especially 12 to 14 carbon atoms.

Another suitable epoxy compound is an epoxidized triglyceride which contains at least one epoxide group and at least one straight chain alkyl or alkene group having at least six carbon atoms. The straight chain alkyl or alkene group may be terminal (i.e., at an end of the molecular chain) or internal (i.e., located other than at an end of the molecule). Preferably, the epoxidized triglyceride contains at least one terminal straight-chain alkyl or alkenyl group having at least six carbon atoms. If the group is an alkenyl group, it preferably contains only one carbon-carbon double bond. The epoxidized triglyceride may contain 1 to 4 or more epoxy groups, and preferably contains 1 to 3 epoxy groups.

Examples of epoxidized triglycerides are epoxidized vegetable oils such as epoxidized soybean oil, epoxidized canola oil, epoxidized olive oil, epoxidized linseed oil, epoxidized corn oil, epoxidized palm oil, epoxidized cottonseed oil and the like.

Certain of the epoxidized triglycerides such as epoxidized soybean oil are commercially available, and those commercially available products are useful. Other epoxidized triglycerides are conveniently formed by treating a vegetable oil that contains unsaturated fatty acid groups with a peroxy compound or oxygen in known manner to convert some or all of the unsaturation to oxirane groups.

The polyester polyol of the invention can be made in one or two steps. In a one-step process, the dicarboxylic acid, anhydride and/or diester, the epoxy compound and the polyol are formed into a reaction mixture and allowed to react simultaneously to form the product polyester polyol.

In a two-step process, the aromatic dicarboxylic acid or corresponding anhydride or diester is first reacted with the epoxy compound. The dicarboxylic acid, anhydride or diesters is present in excess so only a small portion of the acid, anhydride or ester groups are consumed. The oxirane ring reacts with the carboxylic acid, anhydride or ester groups to produce an ester group and in so doing a new hydroxyl group is produced, as illustrated here:

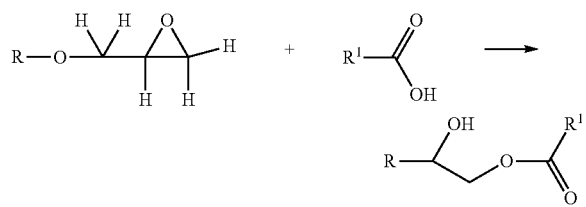

where R is as described before and $R^1$ represents an organic group.

The ester-containing intermediate so produced is then reacted with an excess of the polyol to consume the remaining acid, anhydride or ester groups of the starting compounds and produce the produce polyether polyol.

Suitable conditions for performing the reactions that form the polyester polyol include an elevated temperature (such as 100 to 250° C.) and the presence of an esterification catalyst. The esterification catalyst may include various strong acids, various titanium and tin catalysts, and other catalysts as are known to promote esterification reactions. Subatmospheric pressures may be present, so help remove reaction by-products such as water and lower alkanols that may form.

The reaction is continued until the oxirane groups of the epoxy compound and the acid, anhydride or ester groups of the starting dicarboxylic acid, anhydride or diester compound are essentially (at least 95%) consumed. It is preferred to react at least 98% or at least 99% of the oxirane groups and at least 98% or at least 99% of the acid, anhydride and/or ester groups of the starting materials are consumed.

The product of this reaction is a polyester polyol. It has a hydroxyl functionality of at least 2, preferably at least 2.5, up to 4, preferably up to 3.5 and more preferably up to 3. Its hydroxyl equivalent weight may be from 100 to 5000, but is preferably 150 to 500, more preferably 180 to 250 and even more preferably 200 to 250. The epoxy compound preferably constitutes 2 to 25% of the total weight of the reactants used to make the polyester polyol, more preferably 5 to 15% thereof and still more preferably 6 to 12% thereof. Residues of the epoxy compound preferably constitute corresponding proportions of the total weight of the polyester polyol product.

The polyester polyol of the invention can be used as the sole polyol in making a rigid polyurethane foam. More typically, however, the polyester polyol of the invention is one component of a polyol blend that includes one or more other polyols. In certain embodiments, the polyol blend a) at least 25% by weight, based on the combined weights of all polyols in the polyol blend, of a polyether polyol having a hydroxyl functionality of greater than four and a hydroxyl equivalent weight of up to 250;

b) at least 10% by weight, based on the combined weights of all polyols in the polyol blend, of at least one polyether polyol having a hydroxyl functionality of 2 to 4 and a hydroxyl equivalent weight of up to 700; and c) 8 to 30% by weight, based on the combined weights of all polyols in the polyol blend, of the polyester polyol of the invention.

Examples of polyols of type a) are alkoxylates of initiator compounds that have at least 5 oxyalkylatable hydrogen atoms. The oxyalkylatable hydrogen atoms are preferably hydroxyl or amino hydrogens. Examples of such initiator compounds include sugars such sorbitol, sucrose, mannitol, glucose, dextrose, fructose, galactose and the like. Amine compounds having five or more amine hydrogens such as diethylene triamine, diethylenetetramine, higher polyethyleneamines, various aromatic triamines and the like are also useful initiators. Sorbitol- and sucrose-initiated polyols are preferred on the basis of availability and cost. The hydroxyl equivalent weight of the type a) polyols preferably is in each case 30 to 175 and more preferably is 50 to 120.

Component b) of the polyol blend preferably includes at least one polyol having a hydroxyl equivalent weight of up to 400, more preferably up to 175, optionally in combination with at least one polyol having a hydroxyl equivalent weight of 401 to 700. Examples of polyols of type b) are alkoxylates of initiator compounds having 2 to 4 oxyalkylatable hydrogens, which again are preferably hydroxyl or amino hydrogens. Suitable hydroxyl-containing initiator compounds include water, ethylene glycol, 1,2-propane diol, 1,3-propane diol, diethylene glycol, triethylene glycol, dipropylene glycol, tripropylene glycol, 1,4-butane diol, 1,2-cyclohexanediol, glycerin, trimethylolpropane, trimethylolethane, 2,2-dimethyl-1,3-propane diol, erythritol, pentaerythritol triethanolamine, triisopropanolamine and the like. Suitable amine and aminoalcohol initiators include, for example, ethylene diamine, propylene diamine, toluene diamine, diethyltoluene diamine, methyl amine, ethyl amine, n-propyl amine, n-butyl amine, 2-propylamine, t-butyl amine, sec-butylamine, piperazine, methylene bis(cyclohexylamine hexamethylenediamine, diethanolamine, monoethanolamine, monoisopropanolamine, and the like.

The alkoxides used to make polyols of types a) and b) may be, for example, ethylene oxide, propylene oxide, 1,2-butylene oxide, tetrahydrofuran, styrene oxide and the like. Ethylene oxide, propylene oxide and mixtures of ethylene oxide and propylene oxide are preferred.

In some cases, the type a) and type b) polyols can be provided as a previously prepared mixture. Such mixtures can be manufactured by alkoxylating a mixture of at least one initiator having at least five oxyalkylatable hydrogens and at least one initiator having 2 to 4 oxyalkylatable hydrogens. So-called sucrose/glycerin polyols, for example, which are made by alkoxylating a mixture of sucrose and glycerin to produce a mixture of hexafunctional polyol compounds and trifunctional polyol compounds are useful herein, and their hexafunctional and trifunctional components, respectively, correspond to polyols of types a) and b) respectively.

In preferred embodiments, the polyol blend contains 40 to 75% by weight of one or more type a) polyols; from 17 to 52% of one or more type b) polyols and 8 to 25% of the polyol (type c)) of this invention. In other specific embodiments, the polyol blend contains 50 to 65% of one or more type a) polyols, 30 to 50% of one or more type b) polyols and 10 to 20% of the polyol (type c)) of the invention. These percentages are all by weight and based on the total weight of all polyols in the polyol blend.

The polyol blend may in addition contain small quantities of other polyols. The polyol blend may also contain other isocyanate-reactive materials, but these materials preferably constitute at most 10% by weight of the all isocyanate-reactive materials in the blend. An example of such another polyol is a polyester polyol, different from that of the invention. Such a polyester polyol preferably has a hydroxyl equivalent weight of up to 250, more preferably up to 175 and a hydroxyl functionality of 2 to 8.

A rigid polyurethane foam is prepared from the polyester polyol or polyol blend of this invention by combining the polyester polyol or polyol blend with a polyisocyanate and curing the reaction mixture in the presence of a hydrocarbon blowing agent. Because an advantage of this invention is that the hydrocarbon blowing agent is compatible with the polyol of the invention and/or the polyol blend of the invention, it is preferred to form, prior to the start of the foaming process, a formulated polyol composition that includes the polyol or polyol blend of the invention and at least one hydrocarbon blowing agent. The previously-made formulated polyol composition is then mixed with the polyisocyanate at the time the foam is to be made.

In certain embodiments, such a formulated polyol composition will comprise 75 to 90% by weight of a mixture of polyols and 10 to 25% by weight of a hydrocarbon blowing agent, the weight percentages being based on the combined weight of the polyols in the formulated polyol composition and the hydrocarbon blowing agent (and therefore exclusive of other components, if any, in the formulated polyol composition) wherein the polyols comprise:

a) at least 25% by weight, based on the combined weights of all polyols in the formulated polyol composition, of a polyether polyol having a hydroxyl functionality of greater than four and a hydroxyl equivalent weight of up to 250;

b) at least 10% by weight, based on the combined weights of all polyols in the formulated polyol composition, of at least one polyether polyol having a hydroxyl functionality of 2 to 4 and a hydroxyl equivalent weight of up to 700; and c) 8 to 30% by weight, based on the combined weights of all polyols in the formulated polyol composition, of the polyester polyol of the invention.

In such a formulated polyol composition, the various polyols and their proportions are advantageously as discussed above with regard to the polyol blend of the invention.

The amount of hydrocarbon blowing agent preferably is 12 to 25%, more preferably 14 to 20%, of the combined weight of hydrocarbon blowing agent and polyols in the formulated polyol composition. Preferably, the amount of hydrocarbon blowing agent is selected such that a mixture of blowing agent and polyol blend by themselves is a clear liquid at 25° C. The formation of a clear liquid indicates the hydrocarbon blowing agent is soluble in the polyol(s) at the relative proportions as are present.

The organic polyisocyanate or mixture thereof advantageously contains an average of at least 2.5 isocyanate groups per molecule. A preferred isocyanate functionality is from about 2.5 to about 3.6 or from about 2.6 to about 3.3 isocyanate groups/molecule. The polyisocyanate or mixture thereof advantageously has an isocyanate equivalent weight of about 80 to 1000, preferably 130 to 200, more preferably 130 to 185 and even more preferably 130 to 170. These functionality and equivalent weight values need not apply with respect to any single polyisocyanate in a mixture, provided that the mixture as a whole meets these values.

Suitable polyisocyanates include aromatic, aliphatic and cycloaliphatic polyisocyanates. Aromatic polyisocyanates are generally preferred. Exemplary polyisocyanates include, for example, m-phenylene diisocyanate, 2,4- and/or 2,6-toluene diisocyanate (TDI), the various isomers of diphenylmethanediisocyanate (MDI), hexamethylene-1,6-diisocyanate, tetramethylene-1,4-diisocyanate, cyclohexane-1,4-diisocyanate, hexahydrotoluene diisocyanate, hydrogenated MDI (H12 MDI), naphthylene-1,5-diisocyanate, methoxyphenyl-2,4-diisocyanate, 4,4'-biphenylene diisocyanate, 3,3'-dimethoxy-4,4'-biphenyl diisocyanate, 3,3'-dimethyldiphenylmethane-4,4'-diisocyanate, 4,4',4"-triphenylmethane diisocyanate, polymethylene polyphenylisocyanates, hydrogenated polymethylene polyphenyl polyisocyanates, toluene-2,4,6-triisocyanate and 4,4'-dimethyldiphenylmethane-2,2',5,5'-tetraisocyanate. Preferred polyisocyanates are the so-called polymeric MDI products, which are a mixture of polymethylene polyphenylene polyisocyanates in monomeric MDI. Especially suitable polymeric MDI products have a free MDI content of from 5 to 50% by weight, more preferably 10 to 40% by weight. Such polymeric MDI products are available from The Dow Chemical Company under the trade names PAPI® and Voranate®.

An especially preferred polyisocyanate is a polymeric MDI product having an average isocyanate functionality of from 2.6 to 3.3 isocyanate groups/molecule and an isocyanate equivalent weight of from 130 to 170. Suitable commercially available products of that type include PAPI™ 27, Voranate™ M229, Voranate™ 220, Voranate™ 290, Voranate™ M595 and Voranate™ M600, all from The Dow Chemical Company.

Isocyanate-terminated prepolymers and quasi-prepolymers (mixtures of prepolymers with unreacted polyisocyanate compounds) can also be used. These are prepared by reacting a stoichiometric excess of an organic polyisocyanate with a polyol, such as one or more of the polyols described above. Suitable methods for preparing these prepolymers are well known. Such a prepolymer or quasi-prepolymer preferably has an isocyanate functionality of from 2.5 to 3.6 and an isocyanate equivalent weight of from 130 to 200.

The polyisocyanate is used in an amount sufficient to provide an isocyanate index of from 80 to 1000. Isocyanate index is calculated as the number of reactive isocyanate groups provided by the polyisocyanate component divided by the number of isocyanate-reactive groups in the polyurethane-forming composition (including those contained by isocyanate-reactive blowing agents such as water) at the start of reaction and multiplying by 100. Water is considered to have two isocyanate-reactive groups per molecule for purposes of calculating isocyanate index. A preferred isocyanate index is from 90 to 400 and a more preferred isocyanate index is from 95 to 150 or 100 to 130.

The hydrocarbon blowing agent should have a boiling temperature of at least 25° C. Among the suitable hydrocarbon blowing agents are isopentane, n-pentane, cyclopentane, cyclohexane, n-hexane, 2-methyl pentane and the like. Cyclopentane is a preferred hydrocarbon blowing agent.

It is generally preferred to further include water in the formulation, in addition to the physical blowing agent. Water reacts with isocyanate groups to produce carbon dioxide, which acts as an expanding gas. Water is suitably used in an amount within the range of 0.5 to 3.5, preferably from 1.5 to 3.0 parts by weight per 100 parts by weight of polyol(s).

The reaction mixture typically will include at least one catalyst for the reaction of the polyol(s) and/or water with the polyisocyanate. Suitable urethane-forming catalysts include those described by U.S. Pat. No. 4,390,645 and in WO 02/079340, both incorporated herein by reference. Representative catalysts include tertiary amine and phosphine compounds, chelates of various metals, acidic metal salts of strong acids; strong bases, alcoholates and phenolates of various metals, salts of organic acids with a variety of metals, organometallic derivatives of tetravalent tin, trivalent and pentavalent As, Sb and Bi and metal carbonyls of iron and cobalt.

Tertiary amine catalysts are generally preferred. Among the tertiary amine catalysts are dimethylbenzylamine (such as Desmorapid® DB from Rhine Chemie), 1,8-diaza (5,4,0)undecane-7 (such as Polycat® SA-1 from Air Products), pentamethyldiethylenetriamine (such as Polycat® 5 from Air Products), dimethylcyclohexylamine (such as Polycat® 8 from Air Products), triethylene diamine (such as Dabco® 33LV from Air Products), dimethyl ethyl amine, n-ethyl morpholine, N-alkyl dimethylamine compounds such as N-ethyl N,N-dimethyl amine and N-cetyl N,N-dimethylamine, N-alkyl morpholine compounds such as N-ethyl morpholine and N-coco morpholine, and the like. Other tertiary amine catalysts that are useful include those sold by Air Products under the trade names Dabco® NE1060, Dabco® NE1070, Dabco® NE500, Dabco® TMR-2, Dabco® TMR 30, Polycat® 1058, Polycat® 11, Polycat 15, Polycat® 33 Polycat® 41 and Dabco® MD45, and those sold by Huntsman under the trade names ZR 50 and ZR 70. In addition, certain amine-initiated polyols can be used herein as catalyst materials, including those described in WO 01/58976 A. Mixtures of two or more of the foregoing can be used.

The catalyst is used in catalytically sufficient amounts. For the preferred tertiary amine catalysts, a suitable amount of the catalysts is from about 1 to about 4 parts, especially from about 1.5 to about 3 parts, of tertiary amine catalyst(s) per 100 parts by weight of the polyol(s).

The polyurethane-forming composition also preferably contains at least one surfactant, which helps to stabilize the cells of the composition as gas evolves to form bubbles and expand the foam. Examples of suitable surfactants include alkali metal and amine salts of fatty acids such as sodium oleate, sodium stearate sodium ricinolates, diethanolamine oleate, diethanolamine stearate, diethanolamine ricinoleate, and the like: alkali metal and amine salts of sulfonic acids such as dodecylbenzenesulfonic acid and dinaphthylmethanedisulfonic acid; ricinoleic acid; siloxane-oxalkylene polymers or copolymers and other organopolysiloxanes; oxyethylated alkylphenols (such as Tergitol NP9 and Triton X100, from The Dow Chemical Company); oxyethylated fatty alcohols such as Tergitol 15-S-9, from The Dow Chemical Company; paraffin oils; castor oil; ricinoleic acid esters; turkey red oil; peanut oil; paraffins; fatty alcohols; dimethyl polysiloxanes and oligomeric acrylates with polyoxyalkylene and fluoroalkane side groups. These surfactants are generally used in amounts of 0.01 to 6 parts by weight based on 100 parts by weight of the polyol.

Organosilicone surfactants are generally preferred types. A wide variety of these organosilicone surfactants are commercially available, including those sold by Evonik Industries under the Tegostab® name (such as Tegostab B-8462, B8427, B8433 and B-8404 surfactants), those sold by Momentive Specialty Chemicals, Inc. under the Niax® name (such as Niax® L6900 and L6988 surfactants) as well as various surfactant products commercially available from Air Products and Chemicals, such as DC-193, DC-198, DC-5000, DC-5043 and DC-5098 surfactants.

In addition to the foregoing ingredients, the polyurethane-forming composition may include various auxiliary components such as fillers, colorants, odor masks, flame retardants, biocides, antioxidants, UV stabilizers, antistatic agents, viscosity modifiers and the like.

Examples of suitable flame retardants include phosphorus compounds, halogen-containing compounds and melamine.

Examples of fillers and pigments include calcium carbonate, titanium dioxide, iron oxide, chromium oxide, azo/diazo dyes, phthalocyanines, dioxazines, recycled rigid polyurethane foam and carbon black.

Examples of UV stabilizers include hydroxybenzotriazoles, zinc dibutyl thiocarbamate, 2,6-ditertiarybutyl catechol, hydroxybenzophenones, hindered amines and phosphites.

Except for fillers, the foregoing additives are generally used in small amounts. Each may constitute from 0.01 percent to 3 percent of the total weight of the polyurethane formulation. Fillers may be used in quantities as high as 50% of the total weight of the polyurethane formulation, but can be omitted, as is typical in cavity-filling applications.

The polyurethane-forming composition is prepared by bringing the various components together under conditions such that the polyol(s) and isocyanate(s) react, the blowing agent generates a gas, and the composition expands and cures. All components (or any sub-combination thereof) except the polyisocyanate can be pre-blended into a formulated polyol composition if desired, which is then mixed with the polyisocyanate when the foam is to be prepared. The components may be preheated if desired, but this is usually not necessary, and the components can be brought together at about room temperature (~22° C.) to conduct the reaction. It is usually not necessary to apply heat to the composition to drive the cure, but this may be done if desired, too.

The invention is particularly useful in so-called "pour-in-place" applications, in which the polyurethane-forming composition is dispensed into a cavity and foams within the cavity to fill it and provide structural and/or thermal insulative attributes to an assembly. The nomenclature "pour-in-place" refers to the fact that the foam is created at the location where it is needed, rather than being created in one step and later assembled into place in a separate manufacturing step. Pour-in-place processes are commonly used to make appliance products such as refrigerators, freezers, and coolers and similar products which have walls that contain thermal insulation foam.

The walls of appliances such as refrigerators, freezers and coolers are most conveniently insulated in accordance with the invention by first assembling an outer shell and an interior liner together, such that a cavity is formed between the shell and liner. The cavity defines the space to be insulated as well as the dimensions and shape of the foam that is produced. Typically, the shell and liner are bonded together in some way, such as by welding, melt-bonding or through use of some adhesive (or some combination of these) prior to introduction of the foam formulation. In most cases, the shell and liner may be supported or held in the correct relative positions using a jig or other apparatus. One or more inlets to the cavity are provided, through which the foam formulation can be introduced. Usually, one or more outlets are provided to allow air in the cavity to escape as the cavity is filled with the foam formulation and the foam formulation expands.

The materials of construction of the shell and liner are not particularly critical, provided that they can withstand the conditions of the curing and expansion reactions of the foam formulation. In most cases, the materials of construction will be selected with regard to specific performance attributes that are desired in the final product. Metals such as steel are commonly used as the shell, particularly in larger appliances such as freezers or refrigerators. Plastics such as polycarbonates, polypropylene, polyethylene styrene-acrylonitrile resins, acrylonitrile-butadiene-styrene resins or high-impact polystyrene are used more often in smaller appliances (such as coolers) or those in which low weight is important. The liner may be a metal, but is more typically a plastic as just described.

The foam formulation is then introduced into the cavity. The various components of the foam formulation are mixed together and the mixture introduced quickly into the cavity, where the components react and expand. It is common to pre-mix the polyol(s) together with the water and blowing agent (and often catalyst and/or surfactant as well) to produce a formulated polyol. The formulated polyol can be stored until it is time to prepare the foam, at which time it is mixed with the polyisocyanate and introduced into the cavity. It is usually not required to heat the components prior to introducing them into the cavity, nor it is usually required to heat the formulation within the cavity to drive the cure, although either or both of these steps may be taken if desired. The shell and liner may act as a heat sink in some cases, and remove heat from the reacting foam formulation. If necessary, the shell and/or liner can be heated somewhat (such as up to 50° C. and more typically 35-40° C.) to reduce this heat sink effect, or to drive the cure.

Enough of the foam formulation is introduced such that, after it has expanded, the resulting foam fills those portions of the cavity where foam is desired. Most typically, essentially the entire cavity is filled with foam. It is generally preferred to "overpack" the cavity slightly, by introducing more of the foam formulation than is minimally needed to fill the cavity, thereby increasing the foam density slightly. The overpacking provides benefits such as better dimensional stability of the foam, especially in the period following demold. Generally, the cavity is overpacked by from 4 to 20% by weight. The final foam density for most appliance applications is preferably in the range of from 28.8 to 40 kg/m$^3$.

After the foam formulation has expanded and cured enough to be dimensionally stable, the resulting assembly can be "demolded" by removing it from the jig or other support that is used to maintain the shell and liner in their correct relative positions. Short demold times are important to the appliance industry, as shorter demold times allow more parts to be made per unit time on a given piece of manufacturing equipment.

Demold times can be evaluated as follows: A 28-liter "jumbo" mold coated with release agent is conditioned to a temperature of 45° C. 896 g±4 g of a foam formulation is injected into the mold in order to obtain a 32±2 kg/m$^3$ density foam. After a period of 6 minutes, the foam is removed from the mold and the thickness of the foam is measured. After a further 24 hours at room temperature, the foam thickness is re-measured. The difference between the thickness after 24 hours and the initial thickness is an indication of the post-demold expansion of the foam, which in turn is an indication of whether the foam is adequately cured at the time of demold.

The polyurethane foam advantageously exhibits a low k-factor. The k-factor of a foam may depend on several variables, of which density is an important one. For many applications, a rigid polyurethane foam having a density of from 28.8 to 40 kg/m$^3$ (1.8 to 2.5 pounds/cubic foot) exhibits a good combination of physical properties, dimensional stability, and cost. Foam in accordance with the invention, having a density within that range, preferably exhibits a 10° C. k-factor of no greater than 22, preferably no greater than 20 mW/m-° K. Higher density foam may exhibit a somewhat higher k-factor.

In addition to the appliance and thermal insulation foams described above, the invention is also useful to produce vehicle noise dampening foams, one or more layers of a laminated board, pipe insulation and other foam products. The invention is of special interest when a rapid cure is wanted, and/or good thermal insulating properties are wanted in the foam.

If desired, the process of the invention can be practiced in conjunction with vacuum assisted injection (VAI) methods as described, for example, in WO 07/058793, in which the reaction mixture is injected into a closed mold cavity which is at a reduced pressure. In the VAI process, the mold pressure is reduced to 300 to 950 mbar (30 to 95 kPa), preferably from 400 to 900 mbar (40 to 90 kPa) and even more preferably from 500 to 850 mbar (50 to 85 kPa), before or immediately after the foam forming composition is charged to the mold. The following examples are provided to illustrate the invention, but are not intended to limit the scope thereof. All parts and percentages are by weight unless otherwise indicated.

Polyester Polyol Examples 1 and 2 and Comparative Polyol A

Polyester Polyol Example 1 is prepared by forming a mixture of 36.7 parts terephthalic acid, 27.9 parts diethylene glycol, 5.3 parts glycerin, 21.8 parts of a 450 molecular weight poly(propylene oxide) triol and 8.3 parts of epoxidized soybean oil. This mixture is heated at 235° C. under nitrogen with stirring in the presence of a titanium catalyst until the carboxyl and epoxy groups are consumed. The resulting polyol (Example 1) has an average hydroxyl functionality of 2.7, a hydroxyl number of 264 (corresponding to a hydroxyl equivalent weight of about 212.5), and a viscosity of 25,000 mPa·s at 25° C.

Polyester Polyol Example 2 is made in the same manner, except the epoxidized soybean oil is substituted with an equal amount of an epoxy compound corresponding to the glycidyl ether of a mixture of docecanol and tetradecanol. Polyester Polyol Example 2 has a hydroxyl functionality of 2.7-3.0, a hydroxyl number of 263 (corresponding to a hydroxyl equivalent weight of about 213), and has a viscosity of 23,000 mPa·s at 25° C.

Comparative Polyester Polyol A is a difunctional polyester polyol having a hydroxyl number of 240 (equivalent to a hydroxyl equivalent weight of about 273) and a viscosity of 3250 mPa·s at 25° C. It is available commercially as Stepanpol® PS2352 from Stepan Chemical Company.

Comparative Polyester Polyol B is made in the same manner as Examples 1 and 2, except the epoxy compounds are omitted. Comparative Polyol A has a functionality of 2.7, a hydroxyl number of 264 (corresponding to a hydroxyl equivalent weight of about 212) and a viscosity of 40,000 mPa·s at 25° C.

Formulated polyol mixtures suitable for making rigid polyurethane foam are made from each of Polyester Polyol Examples 1 and 2 and Comparative Polyester Polyols A and B with cyclopentane. The ingredients are as indicated in Table 1 below. The compatibility of cyclopentane in each of the polyol mixtures is evaluated as follows: 100 parts of the polyol mixture are blended with 14, 16 or 18 parts of cyclopentane, and placed into closed 250 mL glass laboratory bottles for one week at room temperature. The bottles are then visually examined for signs of incompatibility. A clear mixture at the end of the week indicates excellent compatibilization. The formation of a hazy mixture indicates that the sample is at or near the limit of compatibility. Phase separation indicates a lack of compatibility. Results are as indicated in Table 1. As a further comparison, a polyol mixture containing both Comparative Polyester Polyol B and the epoxy compound used to make Polyester Polyol Example 2 is evaluated.

pentane are premixed and are then processed into foam on a high pressure injection machine at a component temperature of 20° C. at a mix pressure of about 15000 kPa. The isocyanate index is 115 to 117.

A portion of each reaction mixture is dispensed into an open box, and cream time, gel time and tack free time are measured. Cream time is the time after dispensing at which the first visual change is seen in the formulation. Gel time and tack free time are measured by periodically touching a spatula to the surface of the foam. The gel time is the time after dispensing at which the reaction mixture form strings when the spatula is pulled away. Tack-free time is the time at which the reaction mixture no longer sticks to the spatula. The density of the cured box foam is measured as the free rise density (FRD).

Additional portions of each reaction mixture are dispensed into a 200×20×5 cm Brett mold which is held at a 45° angle during filing and immediately raised to vertical when the necessary amount of material has been dispensed. The minimum fill density is determined, and additional moldings are made at 10% overpacking. Flow index is calculated as

TABLE 1

| Ingredient | Example or Comparative Example | | | | |
|---|---|---|---|---|---|
| | A* | B* | 1 | 2 | C* |
| Propoxylated sorbitol, OH number 480 | 52.7 | 52.7 | 52.7 | 52.7 | 52.7 |
| 1000 MW Propoxylated glycerin | 25.0 | 25.0 | 25.0 | 25.0 | 25.0 |
| Comparative Polyol A | 14 | 0 | 0 | 0 | 0 |
| Comparative Polyol B | 0 | 14 | 0 | 0 | 12.7 |
| Polyester Polyol A | 0 | 0 | 14 | 0 | 0 |
| Polyester Polyol B | 0 | 0 | 0 | 14 | 0 |
| Glycidyl ether of C12-14 alkanols | 0 | 0 | 0 | 0 | 1.3 |
| Catalysts | 3.0 | 3.0 | 3.0 | 3.0 | 3.0 |
| Silicone Surfactant | 3.0 | 3.0 | 3.0 | 3.0 | 3.0 |
| Water | 2.3 | 2.3 | 2.3 | 2.3 | 2.3 |
| Results of Compatibility Testing | | | | | |
| 14 parts by weight cyclopentane | Not done | Hazy | Not done | Not done | Not done |
| 16 parts by weight cyclopentane | Hazy | Phase separation | Hazy | Clear | Hazy |
| 18 parts by weight cyclopentane | Phase separation | Phase separation | Phase separation | Hazy | Phase Separation |

As shown in the data in Table 1, Polyester Polyol Example 1 provides the polyol mixture with compatibilization performance equivalent to Comparative Example B and better than Comparative Example. A. It is noted that Comparative Polyol A is a product designed specifically to help compatibilize hydrocarbon blowing agents into rigid polyurethane foam formulations. Polyester Polyol Example 2 provides significantly better compatibilization than either of Polyester Polyol Examples 1 and 2.

Comparative Sample C provides results significantly worse than those of Example 2. This shows that the blend of Comparative Polyester Polyol B and the epoxy compound is less effective than a reaction product made by reacting the epoxy compound into the polyester polyol product itself.

Foam Examples 1-2 and Comparative Foams A and B

Foam Examples 1-2 and Comparative Foams A and B are made from formulated polyol blend Examples 1 and 2 and Comparative Samples A and B as shown in Table 1. 100 parts of each of the polyol blends are mixed with 16 parts cyclopentane and 134 parts of a polymeric MDI having an isocyanate content of 31.6%. The polyol blend and cyclominimum fill density divided by free rise density. Density of the 10% overpacked foam is measured in each case. Thermal conductivity of the 10% overpacked foams are measured at an average plate temperature of 10° C.

Another portion of each reaction mixture is dispensed into a 70×40×10 cm Jumbo Brett mold. The mold is overpacked by 15%. The cured foam is demolded 6 minutes after the reaction mixture is completely dispensed. The demolded foams are stored for 24 hours at room temperature. Their dimensions are then measured, and post-demold expansion is determined.

Results of the foregoing testing are as indicated in Table 2.

TABLE 2

| Test | Comp. Sample A | Comp. Sample B | Ex. 1 | Ex. 2 |
|---|---|---|---|---|
| Cream time, s | 4-5 | 4-5 | 5 | 5 |
| Gel time, s | 36 | 35-36 | 37-38 | 36-37 |
| Tack-free time, s | 47 | 43-47 | 46-48 | 50-51 |

TABLE 2-continued

| Test | Comp. Sample A | Comp. Sample B | Ex. 1 | Ex. 2 |
| --- | --- | --- | --- | --- |
| Free rise density, kg/m$^3$ | 21.2 | 21.2 | 21.2 | 21.4 |
| Minimum fill density, kg/m$^3$ | 27.5 | 28.2 | 28.3 | 28.1 |
| Flow index | 1.30 | 1.33 | 1.33 | 1.31 |
| K-factor, mW/m · K | 19.81 | 19.72 | 19.68 | 19.73 |
| Post-demold expansion, mm | 6.1 | 5.2 | 6.0 | 5.5 |

As can be seen from the data in Table 2, Example 1 processes equivalently to Comparative Sample A and forms a foam having equivalent properties. Comparative Sample B has somewhat lower (better) post-demold expansion than Example 1, but at the cost of poorer compatibility with the cyclopentane. Example 2 performs equivalently to Comparative Sample A in all respects, except post-demold expansion is significantly lower and compatibility with the cyclopentane blowing agent is significantly greater, each of which is a significant benefit. Example 2 is much better than Comparative Sample B in compatibility with the cyclopentane, and performs nearly equivalently otherwise. The lower post-demold expansion of Example 2, and the better results on the compatibility testing, indicate a clear preference for Polyester Polyol 2 over Polyester Polyol 1.

What is claimed is:

1. A polyol blend comprising
   a) at least 40% by weight, based on the combined weights of all polyols in the polyol blend, of a polyether polyol having a hydroxyl functionality of greater than four and a hydroxyl equivalent weight of up to 250;
   b) at least 10% by weight, based on the combined weights of all polyols in the polyol blend, of at least one polyether polyol having a hydroxyl functionality of 2 to 4 and a hydroxyl equivalent weight of up to 700; and
   c) 8 to 30% by weight, based on the combined weights of all polyols in the polyol blend, of a polyester polyol formed by polycondensation of
      (i) at least aromatic dicarboxylic acid, aromatic dicarboxylic anhydride or aromatic dicarboxylic acid diester;
      (ii) a polyol having at least two hydroxyl groups per molecule, or a mixture of two or more such polyols; and
      (iii) an epoxy compound having at least one oxirane group and at least one straight chain alkyl or alkenyl group having at least six carbon atoms;
   until the carboxylic acid, anhydride or ester groups and the oxirane groups are essentially consumed, to produce a polyester polyol having an average hydroxyl functionality of at least 2 hydroxyl groups per molecule, a hydroxyl equivalent weight of 100 to 2000 and at least one straight chain alkyl or alkenyl group having at least six carbon atoms corresponding to the at least one straight chain alkyl or alkenyl group of the epoxy compound, wherein the polycondensation is performed in a two-step process by first reacting components (i) and (iii) such that only a portion of the carboxylic acid, anhydride or ester groups of component (i) are consumed to form a compound having an ester-containing intermediate containing an ester group and a new hydroxyl group, and then reacting the ester-containing intermediate with component (ii).

2. A polyol blend comprising
   a) at least 40% by weight, based on the combined weights of all polyols in the polyol blend, of a polyether polyol having a hydroxyl functionality of greater than four and a hydroxyl equivalent weight of up to 250;
   b) at least 10% by weight, based on the combined weights of all polyols in the polyol blend, of at least one polyether polyol having a hydroxyl functionality of 2 to 4 and a hydroxyl equivalent weight of up to 700; and
   c) 8 to 30% by weight, based on the combined weights of all polyols in the polyol blend, of a polyester polyol formed by polycondensation of
      (i) at least aromatic dicarboxylic acid, aromatic dicarboxylic anhydride or aromatic dicarboxylic acid diester;
      (ii) a polyol having at least two hydroxyl groups per molecule, or a mixture of two or more such polyols; and
      (iii) a glycidyl ether of a straight-chain alkanol having at least six carbon atoms;
   until the carboxylic acid, anhydride or ester groups and the oxirane groups of the glycidyl ether are essentially consumed, to produce a polyester polyol having an average hydroxyl functionality of at least 2 hydroxyl groups per molecule, a hydroxyl equivalent weight of 100 to 2000 and at least one straight chain alkyl group having at least six carbon atoms corresponding to the group based on a straight-chain alkanol group having at least six carbon atoms of the glycidyl ether.

3. The polyol blend of claim 2, wherein component (iii) is a glycidyl ether of a mixture of alkanols having 8 to 14 carbon atoms.

4. The polyol blend of claim 3, wherein the mixture of alkanols having 8 to 14 carbon atoms is a mixture of dodecanol and tetradecanol.

5. The polyol blend of claim 1, wherein component (i) is one or more of phthalic acid, phthalic anhydride, a dialkyl ester of phthalic acid, isophthalic acid, isophthalic anhydride, a dialkyl ester of isophthalic acid, terephthalic acid, terephthalic anhydride, a dialkyl ester of terephthalic acid, trimellitic acid and trimellitic anhydride.

6. The polyol blend of claim 1, which has an average hydroxyl functionality of at least 2.5 and an average hydroxyl equivalent weight of 180 to 250.

7. A formulated polyol composition comprising 75 to 90% by weight of a polyol blend and 10 to 25% by weight of a hydrocarbon blowing agent, the weight percentages being based on the combined weight of the polyols in the formulated polyol composition and the hydrocarbon blowing agent; wherein the polyol blend comprises:
   a) at least 40% by weight, based on the combined weights of all polyols in the polyol blend, of a polyether polyol having a hydroxyl functionality of greater than four and a hydroxyl equivalent weight of up to 250;
   b) at least 10% by weight, based on the combined weights of all polyols in the polyol blend, of at least one polyether polyol having a hydroxyl functionality of 2 to 4 and a hydroxyl equivalent weight of up to 700; and
   c) 8 to 30% by weight, based on the combined weights of all polyols in the polyol blend, of a polyester polyol formed by polycondensation of
      (i) at least aromatic dicarboxylic acid, aromatic dicarboxylic anhydride or aromatic dicarboxylic acid diester;
      (ii) a polyol having at least two hydroxyl groups per molecule, or a mixture of two or more such polyols; and
      (iii) an epoxy compound having at least one oxirane group and at least one straight chain alkyl or alkenyl group having at least six carbon atoms;

until the carboxylic acid, anhydride or ester groups and the oxirane groups are essentially consumed, to produce a polyester polyol having an average hydroxyl functionality of at least 2 hydroxyl groups per molecule, a hydroxyl equivalent weight of 100 to 2000 and at least one straight chain alkyl or alkenyl group having at least six carbon atoms corresponding to the at least one straight chain alkyl or alkenyl group of the epoxy compound.

8. The formulated polyol composition of claim 7, wherein the hydrocarbon blowing agent is one or more of isopentane, n-pentane, cyclopentane, cyclohexane, n-hexane and 2-methyl pentane.

9. The formulated polyol composition of claim 7, wherein the hydrocarbon blowing agent includes cyclopentane.

10. A process for preparing a rigid polyurethane foam, comprising
    A) mixing at least one polyisocyanate compound with the formulated polyol composition of claim 7 at an isocyanate index of 80 to 1000 to form a reactive mixture and
    B) curing the reactive mixture to form a rigid polyurethane foam.

\* \* \* \* \*